United States Patent
Stefani et al.

(10) Patent No.: US 10,622,681 B2
(45) Date of Patent: Apr. 14, 2020

(54) ENERGY STORAGE ASSEMBLY, USE THEREOF, AND ENERGY STORAGE CELL ASSEMBLY

(71) Applicant: Helmholtz-Zentrum Dresden-Rossendorf E.V., Dresden (DE)

(72) Inventors: Frank Stefani, Dresden (DE); Vladimir Galindo, Freital (DE); Norbert Weber, Dresden (DE); Tom Weier, Dresden (DE); Gunter Gerbeth, Dresden (DE)

(73) Assignee: Helmholtz-Zentrum Dresden-Rossendorf e.V., Dresden (DE)

( * ) Notice: Subject to any disclaimer, the term of this patent is extended or adjusted under 35 U.S.C. 154(b) by 780 days.

(21) Appl. No.: 15/037,020

(22) PCT Filed: Oct. 22, 2014

(86) PCT No.: PCT/DE2014/100376
§ 371 (c)(1),
(2) Date: May 16, 2016

(87) PCT Pub. No.: WO2015/070842
PCT Pub. Date: May 21, 2015

(65) Prior Publication Data
US 2016/0261008 A1    Sep. 8, 2016

(30) Foreign Application Priority Data
Nov. 14, 2013 (DE) .................. 10 2013 112 555

(51) Int. Cl.
*H01M 10/00* (2006.01)
*H01M 10/42* (2006.01)
(Continued)

(52) U.S. Cl.
CPC ......... *H01M 10/425* (2013.01); *H01M 4/368* (2013.01); *H01M 10/36* (2013.01);
(Continued)

(58) Field of Classification Search
CPC .. H01H 36/002; H01M 4/0476; H01M 4/368; H01M 10/39; H01M 10/399;
(Continued)

(56) References Cited

U.S. PATENT DOCUMENTS 3,676,337 A * 7/1972 Kolm .................. B03C 1/00
                                                    210/695
2011/0014505 A1   1/2011 Bradwell et al.
(Continued)

FOREIGN PATENT DOCUMENTS

DE   10 2010 002 931   9/2011

OTHER PUBLICATIONS

Rüdiger, Theory of current-driven instability experiments in magnetic Taylor-Couette flows, Nov. 14, 2007, Physical Review E, vol. 76, Iss. 5 (Year: 2007).*
(Continued)

*Primary Examiner* — Nicholas P D'Aniello
(74) *Attorney, Agent, or Firm* — Norris McLaughlin, P.A.

(57) ABSTRACT

An energy storage assembly includes the following: at least one electrochemical cell, wherein the at least one electrochemical cell comprises an anode that is liquid during operation, an electrolyte that is liquid during operation, and a cathode that is liquid during operation; and a magnetic field-generating structure disposed outside the at least one electrochemical cell for generating a magnetic field, wherein the magnetic field-generating structure is configured such that the generated magnetic field penetrates the at least one electrochemical cell.

11 Claims, 9 Drawing Sheets

(51) Int. Cl.
  *H01M 10/36*  (2010.01)
  *H01M 4/36*  (2006.01)
  *H01M 10/39*  (2006.01)
  *H01M 10/615*  (2014.01)

(52) U.S. Cl.
  CPC ......... *H01M 10/39* (2013.01); *H01M 10/399* (2013.01); *H01M 10/615* (2015.04); *H01M 2220/10* (2013.01)

(58) Field of Classification Search
  CPC ............. H01M 10/33; H01M 10/0563; H01M 2300/0022; H01M 2300/0048
  See application file for complete search history.

(56) References Cited

U.S. PATENT DOCUMENTS

2011/0027628 A1  2/2011  Deane et al.
2013/0059176 A1  3/2013  Stefani et al.

OTHER PUBLICATIONS

Ruark et al., Helmholtz coils for producing uniform magnetic fields, Journal of the Optical Society of America, 1926, vol. 13, Iss. 2 (Year: 1926).*
4945884.*
Frank Stefani et al., "How to circumvent the size limitation of liquid metal batteries due to the Tayler instability", Energy Conversion and Management, vol. 52, Issues 8-9, Aug. 2011, pp. 2982-2986.

* cited by examiner

ENERGY STORAGE ASSEMBLY, USE THEREOF, AND ENERGY STORAGE CELL ASSEMBLY

BACKGROUND OF THE INVENTION

The invention relates to an energy storage assembly, to the use thereof, and to an energy storage cell assembly.

In general, when it comes to supplying energy, it may be necessary to create a balance between the supply of generated electric power and the fluctuating demand for electric power, especially when energy sources that fluctuate over time are used, for example when using wind power plants, solar thermal power plants or photovoltaic power plants. This balancing can be achieved, for example, by way of pumped storage plants, compressed air storage power stations and/or flywheels. The use of electrochemical energy storage units, however, can result in design- and/or application-related problems, in addition to high costs, with conventionally available batteries or storage batteries.

SUMMARY OF THE INVENTION

One aspect of various embodiments of the invention can be illustratively seen in providing an electrochemical cell for storing electrical energy, wherein the electrochemical cell has a simple design and efficient space utilization, which allows for high energy storage density (stored electrical energy in relation to the total volume of the electrochemical cell), for example, wherein the electrochemical cell is also configured such that the electric current (the charge current and/or the discharge current) for charging and/or discharging the electrochemical cell does not impair the functional capability of the electrical cell.

An electrochemical cell can be implemented using liquid components, wherein the electrochemical cell is configured such that the liquid components (anode, cathode, and electrolyte) are disposed in layers on top of each other during operation of the electrochemical cell, or become disposed in a layered manner on their own, by virtue of the respective density thereof (mass density), wherein the liquid anode (such as the liquid anode layer) and the liquid cathode (such as the liquid cathode layer) are separated from each other by way of the liquid electrolyte (such as by way of the liquid electrolyte layer).

Various embodiments are based on the finding that, in an electrochemical cell comprising liquid components (anode, cathode, electrolyte), the electric current flowing in the electrochemical cell is notably able to influence the liquid components. In electrochemical cells comprising liquid components, for example, this can make it more difficult or impossible to scale the cells to achieve large volumes (such as more than 0.1 m$^3$). When an electric current is greater than a critical current intensity, for example, wherein the critical current intensity is influenced by the material parameters and the height of the electrochemical cell, for example, a flow can be caused in at least one of the liquid components (for example, due to so-called Tayler instability), wherein this flow can impair the function of the electrochemical cell. For example, it is possible for partial intermixing of the liquid components to take place, or the layer system, which is formed by the liquid components, can be disrupted, possibly resulting in a short circuit, for example the liquid anode may come in direct contact with the liquid cathode. Illustratively speaking, an energy storage assembly based on an electrochemical cell is provided, wherein the energy storage assembly is configured such that the occurrence of a flow (such as the occurrence of Tayler instability) within the liquid components of the electrochemical cell is prevented, or at least the intensity of the flow is reduced, or such that the critical current intensity is increased until a flow occurs (such as Tayler instability) within the liquid components of the electrochemical cell.

In other words, an energy storage assembly based on an electrochemical cell can be provided, wherein the functionality of the energy storage assembly, even with a high charge current and/or discharge current, is not impaired by the occurrence of a flow (or as a result of Tayler instability) in the liquid components of the electrochemical cell. At the same time, the storage density of the electrochemical cell or of the energy storage assembly should be as high as possible, for example at a maximum, and the composition of the electrochemical cell or of the energy storage assembly should be kept as simple as possible, so that the energy storage assembly can be used cost-efficiently, for example on a large scale.

Furthermore, another aspect of various embodiments can be illustratively seen in providing an energy storage cell assembly that comprises multiple electrochemical cells, wherein the multiple electrochemical cells can be stabilized by way of a shared magnetic field-generating structure. For example, an electrochemical cell of the energy storage cell assembly can be coupled to an electromagnetic coil, wherein this coil, during operation of the energy storage cell assembly, generates a magnetic field that penetrates the multiple electrochemical cells of the energy storage cell assembly.

According to various embodiments, an energy storage assembly can comprise the following: at least one electrochemical cell, wherein the at least one electrochemical cell comprises a first electrode (such as an anode) that is liquid during operation, an electrolyte that is liquid during operation, and a second electrode (such as a cathode) that is liquid during operation; and a magnetic field-generating structure disposed outside the outer circumference of the at least one electrochemical cell for generating a magnetic field, wherein the magnetic field-generating structure is configured such that the generated magnetic field penetrates the at least one electrochemical cell, for example through the outer circumference of the at least one electrochemical cell.

Illustratively, the magnetic field can be provided such that the liquid anode, the liquid electrolyte and/or the liquid cathode of the at least one electrochemical cell are stabilized. In other words, for example, the occurrence of a flow within the electrochemical cell can be prevented or at least be reduced, or the critical current, starting at which a flow may occur within the electrochemical cell, can be increased. This ensures the functional capability of the electrochemical cell when charging the electrochemical cell using a high electric current, such as in a range of several kiloamperes to several megaamperes, or the functional capability of the electrochemical cell when withdrawing a high electric current from the electrochemical cell. The energy storage assembly can thus be used as a short-term electrochemical energy storage unit. Furthermore, the energy storage assembly can illustratively be configured such that the flow dynamics within the electrochemical cell is influenced by the externally generated magnetic field. In this way, additional measures, which would necessitate a more complex design, for example, can be dispensed with. For example, the electrochemical cell can have a cylindrical shape, a cuboid shape (or cube shape), or an arbitrary prismatic shape.

According to various embodiments, the magnetic field-generating structure can be disposed outside the electrochemical cell, so that the magnetic field can penetrate from the outside into the electrochemical cell. The electrochemical cell thus does not have to include any through-holes or recesses, for example, in which the magnetic field-generating structure is accommodated, illustratively speaking, the electrochemical cell can have any arbitrary outside shape or surface. The effective portion of the magnetic field-generating structure does not extend through the electrochemical cell, for example.

According to various embodiments, the magnetic field-generating structure can be disposed and configured outside the electrochemical cell. In this way, it is possible to select the design of the electrochemical cell itself independently of the magnetic field-generating structure. It is thus, for example, possible to eliminate the need for a hollow body to be necessarily used as the electrochemical cell. In this way, the spatial efficiency (the energy storage density) can be increased. Furthermore, the energy storage assembly can be cost-effectively produced and/or can be less prone to faults, for example, due to the simple design and the like.

According to various embodiments, an energy storage assembly can comprise: at least one electrochemical cell, wherein the at least one electrochemical cell comprises an anode that is liquid during operation, an electrolyte that is liquid during operation, and a cathode that is liquid during operation; and a magnetic field-generating structure disposed outside the at least one electrochemical cell for generating a magnetic field, wherein the magnetic field-generating structure is configured such that the magnetic field generated by way of the magnetic field-generating structure outside the electrochemical cell penetrates the at least one electrochemical cell.

According to various embodiments, the anode that is liquid during operation of the electrochemical cell can comprise at least one of the following: a metal, a metal alloy, a metalloid, and a metalloid alloy.

According to various embodiments, the cathode that is liquid during operation of the electrochemical cell can comprise at least one of the following: a metal, a metal alloy, a metalloid, and a metalloid alloy.

The magnetic field-generating structure can furthermore comprise a permanent magnet or multiple permanent magnets. The one permanent magnet or the multiple permanent magnets can, for example, be disposed at a distance from the electrochemical cell relative to the electrochemical cell so that the correspondingly generated magnetic field penetrates the electrochemical cell from the outside.

The magnetic field-generating structure can furthermore comprise an electrically conductive coil assembly. The electrically conductive coil assembly can, for example, be disposed at a distance from the electrochemical cell relative to the electrochemical cell such that a magnetic field correspondingly generated by way of the electrically conductive coil assembly penetrates the electrochemical cell from the outside. The electrically conductive coil assembly can comprise one or more coils.

According to various embodiments, the anode that is liquid during operation, the electrolyte that is liquid during operation, and the cathode that is liquid during operation can form a layer structure having at least one interface. The respective materials of the components (anode, electrolyte, and cathode) can each have a different mass density, so that the layer structure of the liquid components is formed in the earth's gravity field. The magnetic field-generating structure can be configured such that a magnetic field component of the generated magnetic field is parallel to a surface normal to the at least one interface of the layer structure. Illustratively speaking, the liquid components of the electrochemical cell can align in the earth's gravitational field, and a magnetic field component of the generated magnetic field is parallel to the aligningly acting gravitational force.

The magnetic field-generating structure can furthermore comprise a coil assembly that can be configured such that the at least one electrochemical cell is positioned between a first coil of the coil assembly and a second coil of the coil assembly. The coil assembly can furthermore be a Helmholtz coil assembly, wherein a substantially uniform magnetic field can be generated between the coils of the Helmholtz coil assembly.

The magnetic field-generating structure can furthermore be connected to the at least one electrochemical cell in an electrically conducting manner, so that current flows through the magnetic field-generating structure, or flows within the magnetic field-generating structure, during charging or discharging of the at least one electrochemical cell. For example, at least one coil of the magnetic field-generating structure can furthermore be connected to the at least one electrochemical cell in an electrically conducting manner, so that current flows through the at least one coil of the magnetic field-generating structure during charging or discharging of the at least one electrochemical cell.

The energy storage assembly can comprise at least one heat source, for example, for heating the at least one electrochemical cell. The heat source can be used to liquefy, or at least partially liquefy, the components of the electrochemical cell. Furthermore, the electrochemical cell can be heated by way of the charge current or by way of the discharge current.

According to various embodiments, an energy storage assembly (as described herein) can be used to store electrical energy by way of a chemical reaction in at least one electrochemical cell. A magnetic field-generating structure can furthermore be used outside the electrochemical cell so as to stabilize the electrochemical cell, such as to reduce or prevent a functional impairment by an occurring Tayler instability. According to various embodiments, an energy storage cell assembly (as described herein) can be used to store electrical energy by way of a chemical reaction in at least one electrochemical cell.

According to various embodiments, the electrochemical cell can comprise a convex cell housing, in which the liquid components of the electrochemical cell can be accommodated.

The electrochemical cell can furthermore comprise a first electrical contact, which is connected to the first electrode (the anode, for example) of the electrochemical cell in an abutting (in other words, in physical contact) and/or electrically conducting (electron conduction) manner. The electrochemical cell can furthermore comprise a second electrical contact, which is connected to the second electrode (the cathode, for example) of the electrochemical cell in an abutting (in other words, in physical contact) or electrically conducting (electron conduction) manner. The magnetic field-generating structure can furthermore be disposed outside the region between the first electrical contact and the second electrical contact, illustratively, the region between the first electrical contact and the second electrical contact can be free of the magnetic field-generating structure, so that the liquid components of the electrochemical cell can be disposed in this region, thus optimizing the storage capacity of the electrochemical cell.

According to various embodiments, an energy storage cell assembly can comprise the following: a cell assembly comprising multiple electrochemical cells, wherein each of the multiple electrochemical cells comprises a first electrode (such as an anode) that is liquid during operation, an electrolyte that is liquid during operation, and a second electrode (such as a cathode) that is liquid during operation; and at least one electromagnetic coil for generating a magnetic field, wherein the at least one electromagnetic coil is disposed outside the cell assembly and configured such that the generated magnetic field penetrates each of the multiple electrochemical cells.

According to various embodiments, an energy storage cell assembly can comprise the following: a cell assembly comprising multiple electrochemical cells, wherein each of the multiple electrochemical cells comprises a first electrode (such as an anode) that is liquid during operation, an electrolyte that is liquid during operation, and a second electrode (such as a cathode) that is liquid during operation; and at least one electromagnetic coil for generating a magnetic field, wherein the at least one electromagnetic coil is disposed outside the multiple electrochemical cells and configured such that the generated magnetic field penetrates each of the multiple electrochemical cells.

The FIGS. show exemplary embodiments of the invention and will be described in detail hereafter.

DETAILED DESCRIPTION OF THE INVENTION

The following detailed description references the accompanying drawings, which form an integral part of the description and which, for illustrative purposes, show specific embodiments in which the invention can be practiced. In this regard, directional terminology such as "top," "bottom," "at the front," "at the back," "front", "back" and the like is used with reference to the orientation of the described figure(s). Since components of embodiments can be positioned in a number of different orientations, the directional terminology is used for illustrative purposes and is not limiting in any way. It goes without saying that other embodiments can be used, or structural or logical modifications can be carried out, without departing from the scope of protection of the present invention. It goes without saying that the features of the various exemplary embodiments described herein can be combined with each other, unless otherwise specifically indicated. The following detailed description should therefore not be interpreted in a limiting sense, and the scope of protection of the present invention is defined by the accompanying claims.

Within the scope of the present description, the terms "connected," "Interconnected" and "coupled" are used to describe direct and indirect connections, direct and indirect interconnections, and direct or indirect coupling. In the figures, identical or similar elements are denoted by identical reference numerals, to the extent this is useful.

In general, an electrochemical cell (such as a battery, a rechargeable battery or a storage battery) can comprise liquid electrode materials, so that the useful life of the electrochemical cell can be extended over conventional electrochemical cells containing solid electrodes, wherein the useful life of the cells containing solid electrodes can be limited as a result of aging-related changes in the electrode structures. Storage batteries containing liquid electrodes are sodium-sulfur (NaS) batteries and sodium-nickel chloride (ZEBRA) batteries, for example. In both storage batteries, the electrolyte is a $\beta''\text{-}Al_2O_3$ ceramic, which conducts sodium ions at higher temperatures (solid electrolyte). The solid electrolyte (a ceramic), however, can be brittle and/or sensitive to thermal shocks, for example, so that the practically implementable diameter of such individual cells may be limited to a few centimeters. Since the price of these cells is dependent on the ratio of the surface of the cell to the volume of the content, the size limitation caused by the use of solid electrolytes also presents an obstacle to the large-scale and economically acceptable use of these batteries for storing electrical energy in the energy supply field.

In addition to the liquid electrode materials, an electrochemical cell can furthermore also include a liquid electrolyte. Here, metalloids or metals such as arsenic, antimony, bismuth, mercury, selenium and/or tellurium, which have sufficiently high electrical conductivity in the liquid state, can function as the positive electrode (the cathode; the designation is conventionally made according to the function during discharging). Furthermore, metalloids or metals, such as magnesium, potassium, sodium, lithium and/or calcium, which have sufficiently high electrical conductivity in the liquid state, can function as the negative electrode (anode). The liquid electrolyte separates the anode that is liquid during operation and the cathode that is liquid during operation (suppresses electron conduction and allows ion conduction). The three materials of the cathode, the anode and the electrolyte that are liquid during operation can be selected such that the density (mass density) of the electrolyte is greater than that of the liquid anode material, and so that the density of the liquid cathode material is greater than the density of the electrolyte. Alternatively, the three materials of the cathode, the anode and the electrolyte that are liquid during operation can be selected such that the density (mass density) of the electrolyte is greater than that of the liquid cathode material, and so that the density of the liquid anode material is greater than the density of the electrolyte. Under these circumstances, natural density stratification of the materials can take place in the earth's gravity field, whereby the necessity of using a porous membrane, for example, is dispensed with.

An electrochemical cell comprising electrode materials that are liquid during operation, which are separated by a liquid electrolyte, can have a high current density, such as in a range of up to approximately 50 $kA/m^2$. The current density is based on the area which results from the interface of the stratification of the liquid materials, which is to say from the contact surface of the electrolyte with the electrodes, for example.

An electrochemical cell comprising electrode materials that are liquid during operation, which are separated by a liquid electrolyte, can be scaled up to a size of several cubic meters, for example, wherein a limitation may exist due to the implementable maximum charge current and discharge current. At a particular current density, the maximum diameter, and thus the total current in the electrochemical cell, may be limited due to the onset of a current-driven instability in liquid metals. This instability is also referred to hereafter as Tayler instability. Furthermore, a flow in the liquid components can also be induced for other reasons.

Tayler instability describes, or is caused by, the interaction of electrical currents with their own magnetic fields, which can result in a flow in liquid metals, for example, if they exceed several kiloamperes (as a function of the specific substance parameters). Tayler instability, which also occurs under the condition of perfectly uniform current flow, can destroy the stable layer of liquid anodic, electrolytic and cathodic materials, and thus result in a short circuit in the electrochemical cell, if it is sufficiently strong. In general, high design complexity is necessary to prevent the occurrence of Tayler instability in an electrochemical cell comprising components that are liquid during operation, such as separate current conduction through the electrochemical cell itself.

According to various embodiments, the energy storage assembly can comprise an electrochemical cell, in which the anode that is liquid during operation or the liquid anodic material, the electrolyte that is liquid during operation or the liquid electrolytic material, and the cathode that is liquid during operation or the liquid cathodic material form a stratification or a layer structure. For a current density (in the range of 10 kA/m2) that is predefined by the electrochemical processes, a critical diameter exists for each of the three liquids at which Tayler instability develops. Due to the flow driven by the Tayler instability, it is possible for the liquid electrolyte layer to break open locally, resulting in a short circuit between the liquid anode material and the liquid cathode material. The critical diameter of the electrochemical cell or of the stratification is determined by the smallest of the critical diameters of the respectively used liquid materials that are liquid during operation.

According to various embodiments, the electrochemical cell can comprise materials that are solid at room temperature, which is to say the anode, the cathode, and the electrolyte can be solid at room temperature, for example. In this state, the electrochemical cell is not functional since it is not possible, for example, for sufficient ion transport to take place through the electrolyte. For the operation of the electrochemical cell, this can have a temperature in a range from approximately 100° C. to approximately 700° C., or a temperature of more than 700° C., so that the anode, the cathode, and the electrolyte turn liquid or are liquid. Given the differing material densities, stratification of the materials may develop on its own as soon as these are liquid.

Various embodiments, for example, are based on the finding that the Tayler instability can be suppressed by applying an external magnetic field having sufficient strength to an electrochemical cell described herein. This applied magnetic field can be generated either by way of a system composed of permanent magnets or by way of a suitable coil assembly. At least a portion of the charge current or discharge current of the battery (of the electrochemical cell) can flow through the coil system, for example. According to various embodiments, for example, no further measures are needed to stabilize the electrochemical cell. Furthermore, the electrochemical cell can be scaled to any arbitrary size, such as having a base area of several square meters. This makes possible higher overall currents in the electrochemical cell and a significant increase in the energy storage capacity of the electrochemical cell, and consequently reduces costs as compared to a corresponding assembly that is composed of many cells having small diameters.

Furthermore, a simple technical design can be used for the electrochemical cell, which results in cost savings and/or allows the design of the electrochemical cell to be optimized, for example, without the limitations that would ensue from Tayler instability. The energy storage assembly described herein can suppress Tayler instability for arbitrarily sized batteries (electrochemical cells), or arbitrarily sized batteries can be stabilized.

Figure 1A:
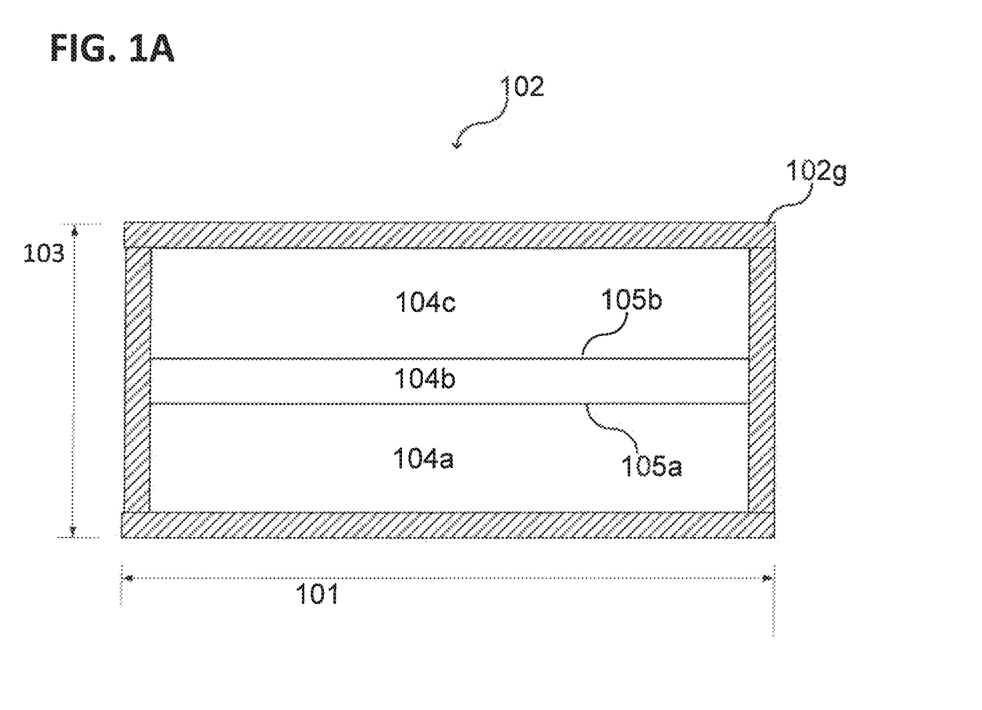
FIGS. 1A and 1B each show a schematic side view or a cross-sectional view of an electrochemical cell, according to various embodiments.

FIG. 1A illustrates a schematic side view or cross-sectional view of an electrochemical cell 102. The electrochemical cell 102 can comprise a first electrode 104a and a second electrode 104c, for example, wherein these can be spatially separate, or be spatially separated, from each other by an electrolyte 104b.

According to various embodiments, the first electrode 104a can comprise at least one material from the following group of materials: aluminum, tin, zinc, gallium, selenium, tellurium, bismuth, mercury, indium, cadmium, antimony, and thallium. The first electrode 104a can furthermore comprise a compound or an alloy, wherein the compound or the alloy can comprise at least one of the aforementioned materials. As a function of the charge state of the electrochemical cell 102, the first electrode 104a can furthermore comprise an alkali metal or an alkaline earth metal.

The first electrode 104a can function as the anode during charging (charging process) of the electrochemical cell 102, and as the cathode during discharging (discharge process) of the electrochemical cell 102. The first electrode 104a can furthermore be the positive electrode.

According to various embodiments, the second electrode 104c can comprise at least one material from the following group of materials: aluminum, lithium, sodium, potassium, calcium, cesium, rubidium, barium, and magnesium.

The second electrode 104c can function as the cathode during charging (charging process) of the electrochemical cell 102, and as the anode during discharging (discharge process) of the electrochemical cell 102. The second electrode 104c can furthermore be the negative electrode.

Furthermore, the first electrode 104a and the second electrode 104c can comprise any material combination that is able to provide an electrochemical cell 102, which is to say they can have the corresponding electrochemical properties and, in liquid form, form a stratification, as is illustrated in FIG. 1A, for example.

The electrolyte 104b can comprise a salt, for example, such as an alkali salt, an alkaline earth salt or a mixture of multiple salts. For example, the electrolyte 104b can comprise a salt (such as a chloride and/or a fluoride) of the respective material of the second electrode 104c.

According to various embodiments, the first electrode can comprise antimony, the second electrode 104c can comprise magnesium, and the electrolyte can comprise a mixture of the salts magnesium chloride, potassium chloride, and sodium chloride. The second electrode 104c (Mg) has a melting temperature of approximately 650° C. and a density of approximately 1584 kg/m$^3$, the first electrode 104a (Mg/Sb) has a melting temperature of approximately 630° C. and a density of approximately 6530 kg/m$^3$, and the electrolyte 104b (MgCl$_2$/KCl/NaCl) has a melting temperature of approximately 400° C. and a density of approximately 1870 kg/m³. In this way, the electrochemical cell 102 can be heated to a temperature of more than approximately 650° C., for example, so that the electrodes 104a, 104c and the electrolyte 104b turn liquid. At a temperature of more than appropriately 650° C., this electrochemical cell 102 is ready for use and, as a result of the material densities, has the corresponding stratification, as described herein.

As is illustrated in FIG. 1A, the stratification of the electrodes 104a, 104c and of the electrolyte 104b can comprise two interfaces 105a, 105b, each between the mutually abutting (liquid) layers. The position of the interfaces 105a, 105b relative to the housing 102g can be independent of the orientation (position) of the housing 102g and be determined, for example, by the acting gravitational force. The housing 102g can be oriented as illustrated, for example, when the electrochemical cell 102 is being operated.

During discharging of the electrochemical cell 102, the magnesium can give off two electrons, for example, and move these as the cation $Mg^{2+}$ through the electrolyte 104b, which functions as an ion conductor, to the first electrode 104a and be received in the material of the first electrode 104a. The first electrode 104a can form an alloy from the original material of the first electrode 104a and the received material of the second electrode 104c. The electrons released at the second electrode 104c are then in sum available as usable electric current.

Analogously, other materials and/or material combinations can be used to operate the electrochemical cell 102.

According to various embodiments, the electrochemical cell 102 (and thus also approximately the electrodes 104a, 104c and the electrolyte 104b) can have a width 101 (or a diameter 101) in a range from approximately several centimeters to approximately several meters, such as in a range from approximately 10 cm to approximately 5 m. The electrochemical cell 102 (and thus also approximately the electrodes 104a, 104c and the electrolyte 104b) can furthermore have a width 101 (or a diameter 101) of more than 5 m. The electrochemical cell 102 can furthermore have a height 103 in a range from approximately several centimeters to approximately several meters, such as in a range from approximately 5 cm to approximately 5 m. The electrochemical cell 102 can furthermore have a height 103 of more than 5 m. The electrochemical cell 102 can furthermore have a volume (such as an internal volume for receiving the electrodes and the electrolyte) in a range from approximately 5 m³ to approximately 100 m³, or a volume of more than approximately 100 m³.

The electrochemical cell 102 can furthermore comprise a housing 102g, which receives the electrodes and the electrolyte. The housing 102g can be at least partially electrically insulated, or comprise an electrically insulating material, so that the electrodes 104a, 104c are not electrically short-circuited with each other. Furthermore, at least one wall or a portion of the housing 102g can be designed to be movable, so that a change in volume of the materials of the electrodes 104a, 104c or of the material of the electrolyte 104b can be compensated for.

Figure 1B:
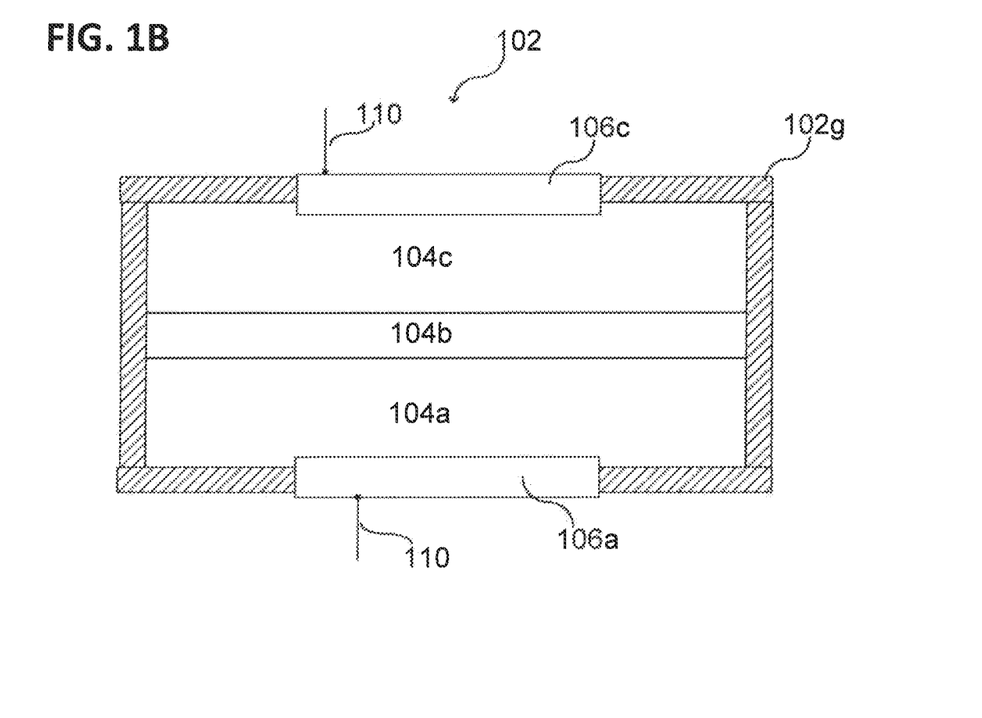

As is shown in FIG. 1B, the electrochemical cell 102 can comprise at least two electrical contacts (or contact structures) 106a, 108c, for providing an electrical circuit 110, which, for example, connects the first electrode 104a and the second electrode 104c to each other in an electrically conductive manner. The electrochemical cell 102 can be charged or discharged by way of the electrical contacts 106a, 108c via the circuit 110. The electrical contacts 108a, 108c can extend at least partially into the interior of the housing 102g, such as partially into the respective electrode 104a, 104c that is liquid during operation, so that the electrical contacts 108a, 106c are in contact with the electrodes 104a, 104c in an electrically conducting manner.

Figure 1C:
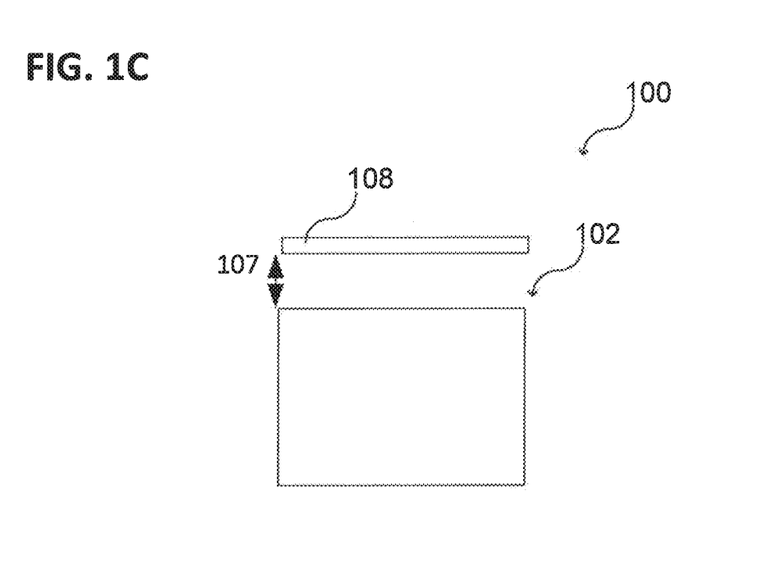
FIGS. 1C to 1F each show a schematic side view or a cross-sectional view of an energy storage assembly, according to various embodiments.

FIG. 1C illustrates an energy storage assembly 100 in a schematic side view or cross-sectional view, wherein the energy storage assembly 100 can comprise at least one electrochemical cell 102, as described above, and furthermore a magnetic field-generating structure 108 disposed outside the electrochemical cell 102 for generating a magnetic field, wherein the magnetic field-generating structure is configured such that the generated magnetic field penetrates the at least one electrochemical cell, for example such that the stratification composed of the electrodes 104a, 104c and the electrolyte 104b within the electrochemical cell 102 is stabilized, as described herein.

The magnetic field-generating structure 108 can be disposed at a distance 107 from the electrochemical cell 102, for example. Furthermore, the magnetic field-generating structure 108 can be disposed relative to the electrochemical cell 102 and be configured such that the magnetic field, which is generated within the electrochemical cell 102 by way of the magnetic field-generating structure 108, is large enough to stabilize the electrochemical cell 102. Within the electrochemical cell 102, a magnetic field having a magnetic flux density in a range of several mT to several hundred mT can be provided, such as a magnetic field having a magnetic flux density in a range of approximately 1 mT to approximately 800 mT.

For example, the housing 102g of the electrochemical cell 102 can have the shape of a simple cuboid, prism or cylinder, for example it may not be a hollow body, or it can have the shape of another arbitrary, but convex body. According to various embodiments, the magnetic field-generating structure 108 can be integrated into the housing 102g of the electrochemical cell 102, or be partially integrated into the housing 102g of the electrochemical cell 102.

According to various embodiments, the electrochemical cell 102 or the housing 102g of the electrochemical cell 102 can have any arbitrary shape, wherein the magnetic field-generating structure 108 can be disposed outside the electrochemical cell 102, for example at a distance 107 from at least one electrode 104a, 104c or at least one electrical contact 108a, 106c of the electrochemical cell 102. According to various embodiments, the magnetic field-generating structure 108 can be configured such that the same does not extend through the electrochemical cell 102.

Figure 1D:
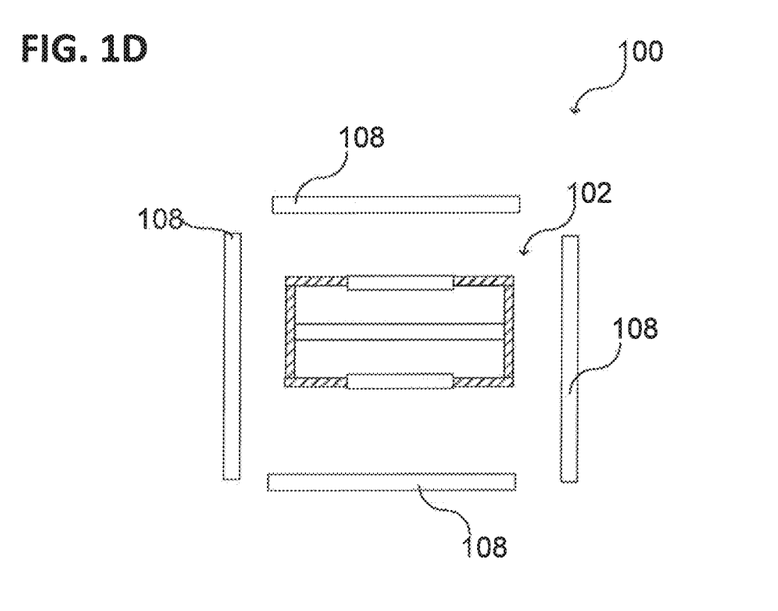

As is illustrated in FIG. 1D, the electrochemical cell 102 can be surrounded by multiple magnetic field-generating structures 108, or the magnetic field-generating structure 108 can comprise multiple components that can surround, or can partially surround, the electrochemical cell 102.

According to various embodiments, the magnetic field-generating structure 108 can be coupled to an open-loop control system or a closed-loop control system, and can be actuated or controlled, for example by way of the open-loop control system or closed-loop control system, so that the electrochemical cell 102 is stabilized, or that the stratification of the liquid components of the electrochemical cell 102 is stabilized. The generated magnetic field can be controlled by open-loop and/or closed-loop control through the one coil or the multiple coils by way of the coil current. The energy storage assembly 100 can furthermore comprise one or more sensors, for example magnetic field sensors (Hall sensors) or current measuring devices, so as to control, by closed-loop control, and/or monitor, the generated magnetic field. The energy storage assembly 100 can furthermore also comprise one or more permanent magnets as the magnetic field-generating structure 108, for example hard ferrite magnets, neodymium-iron-boron magnets, or similar magnets.

Figure 1E:
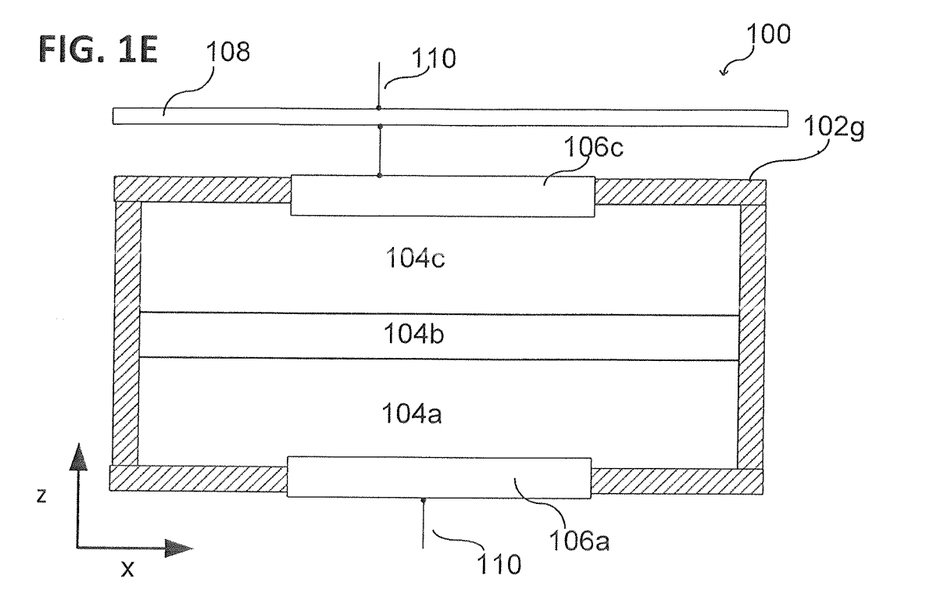

Furthermore, the magnetic field-generating structure 108 of the energy storage assembly 100, as illustrated in FIG. 1E, can comprise at least one electromagnetic coil (i.e., magnetic field generating structure) 108, such as having at least one winding or having at least one conductor loop, wherein the electromagnetic coil 108 can be coupled to the circuit 110 for charging and/or discharging the energy storage assembly 100. For example, the charge current or the discharge current, which is supplied to the electrochemical cell 102 via the circuit 110 or is removed from the electrochemical cell 102, can flow through the at least one electromagnetic coil 108 (or can flow at least partially through the at least one electromagnetic coil 108), so that a magnetic field that penetrates the electrochemical cell 102 from the outside is generated by way of the charge current or discharge current that flows through the at least one electromagnetic coil 108. In this case, the energy storage assembly 100 stabilizes itself since, at a greater charge current or discharge current, the magnetic field generated by way of the magnetic field-generating structure 108 also increases, and in the case where the electrochemical cell 102 is not charged or discharged, no electrical losses occur.

Alternatively, a constant current can flow permanently through the at least one electromagnetic coil 108, so that a sufficiently large magnetic field is generated to stabilize the electrochemical cell 102.

Figure 1F:
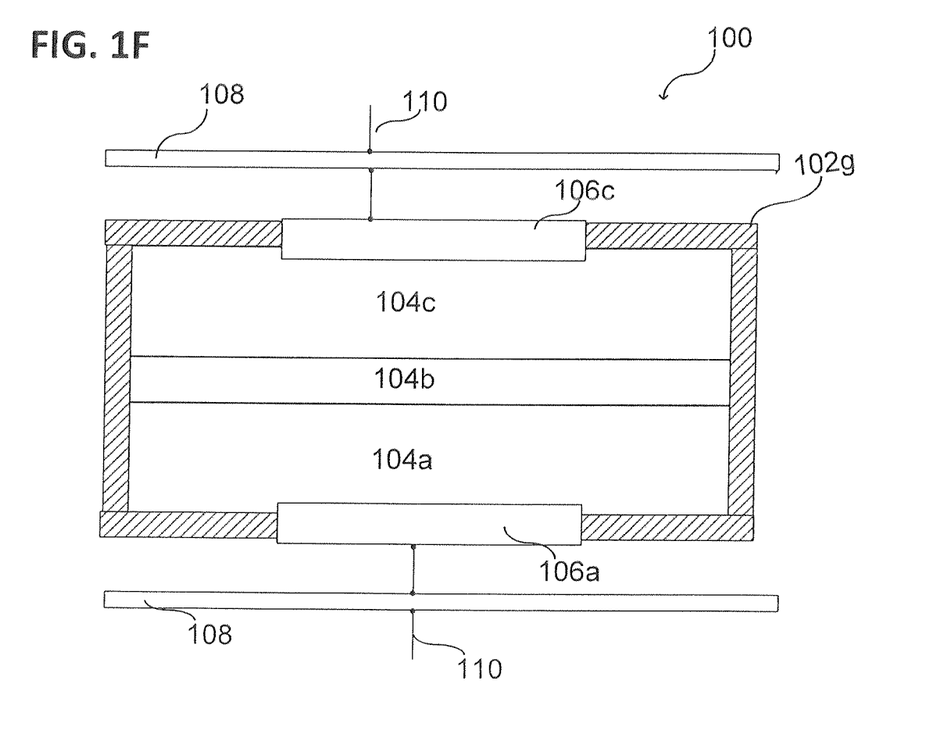

As is shown in FIG. 1F in a further schematic cross-sectional view or side view, the magnetic field-generating structure 108 of the energy storage assembly 100 can comprise multiple electromagnetic coils 108. The electrochemical cell 102 can be disposed between two electromagnetic coils 108, for example, wherein the electromagnetic coils 108 can be coupled to the circuit 110, for example, as described above, such that the charge current or discharge current of the electrochemical cell 102 at the same time also generates a corresponding magnetic field, by way of the electromagnetic coils 108, for stabilizing the electrochemical cell 102 (such as a magnetic field having a magnetic flux density of up to one tesla).

The electromagnetic coil 108 can comprise copper, for example, or another material having high electrical conductivity, so that conduction losses can be minimal. The electromagnetic coil 108 can furthermore comprise a conductor loop, wherein the conductor can have an accordingly large cross-section, so that the conduction losses can be minimal. The electromagnetic coil 108 can furthermore have a plurality of windings, such as 2 to 100 windings, or more than 100 windings.

The diameter of the magnetic field-generating structure 108 (of the one coil, of the multiple coils, of the one permanent magnet or the permanent magnets) can be greater than the width 101 (or the diameter 101) of the electrochemical cell 102, for example.

Various modifications and configurations of the energy storage assembly 100 and details about the electrochemical cell 102 and of the magnetic field-generating structure 108 are described hereafter, wherein the fundamental features and operating principles described with respect to FIGS. 1A to 1F can be analogously incorporated. Furthermore, the features and operating principles described hereafter can be applied analogously to the energy storage assembly 100 described in FIGS. 1A to 1F, or be combined with the energy storage assembly 100 described in FIGS. 1A to 1F.

Figure 2:
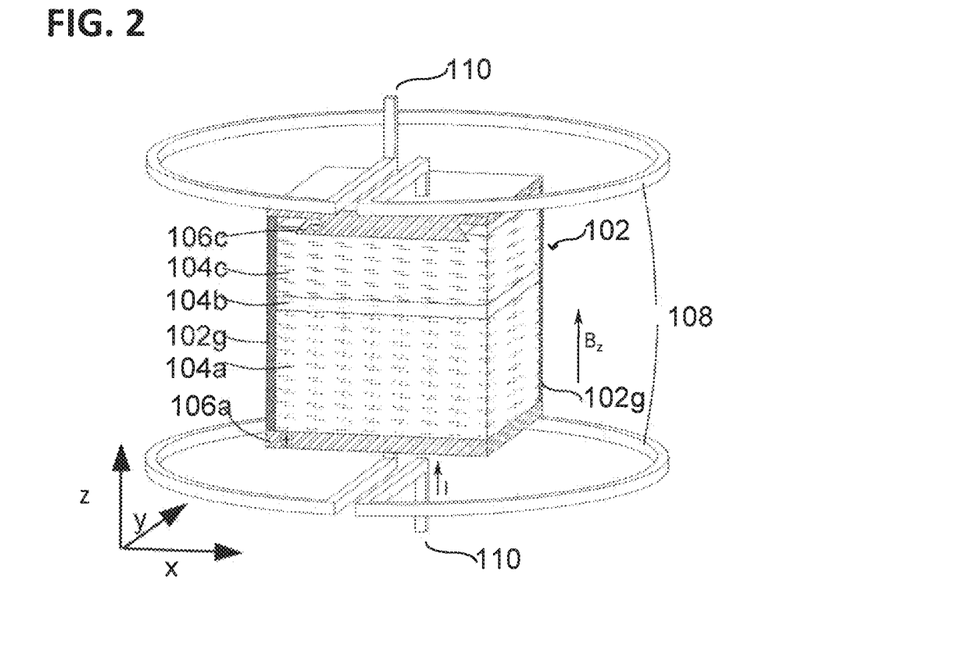
FIG. 2 shows a schematic side view or cross-sectional view of an energy storage assembly, according to various embodiments.

FIG. 2 shows an energy storage assembly 100 in a schematic view, wherein the energy storage assembly 100 comprises the following: at least one electrochemical cell 102, wherein the at least one electrochemical cell 102 comprises a first electrode 104a that is liquid during operation, an electrolyte 104b that is liquid during operation, and a second electrode 104c that is liquid during operation. The first electrode 104a that is liquid during operation, the electrolyte 104b that is liquid during operation, and the second electrode 104c that is liquid during operation each form the anode and the cathode of a rechargeable battery (storage battery), wherein the anode and the cathode are separated by the electrolyte. The energy storage assembly 100 furthermore comprises a magnetic field-generating structure 108 disposed outside the outer circumference of the at least one electrochemical cell 102 for generating a magnetic field, wherein the magnetic field-generating structure 108 is configured such that the generated magnetic field B penetrates the at least one electrochemical cell 102 through the outer circumference of the at least one electrochemical cell 102. The electrochemical cell 102 of the energy storage assembly 100 can furthermore comprise a first contact 108a and a second contact 106c, which are each connected to the first electrode 104a and the second electrode 104c in an electrically conducting manner.

During operation, the energy storage assembly 100 can be heated by way of the charge current and/or the discharge current, so that the components 104a, 104b, 104c turn liquid or remain liquid.

As is illustrated in FIG. 2, the charge current and/or the discharge current I can flow through a first winding (coil) 108 into the electrochemical cell 102, and through a second winding (coil) 108 out of the electrochemical cell 102. The coils 108 of the magnetic field-generating structure 108 can be configured analogously to a Helmholte coil configuration. The coils of the magnetic-field generating structure 108 are illustratively connected in series with the electrochemical cell 102. A magnetic field B, which penetrates the electrochemical cell 102, can be generated by way of the magnetic field-generating structure 108, wherein the magnetic field can have at least one z component $B_z$, which is perpendicular to the interfaces 105a, 105b, wherein the interfaces 105a, 105b result from the stratification of the liquid components 104a, 104b, 104c. In other words, the magnetic field B generated by way of the magnetic field-generating structure 108 can have at least one magnetic field component $B_z$ that is oriented parallel to the normal vector of the interfaces 105a, 105b.

According to various embodiments, the electrochemical cell 102 can be laterally delimited by a housing 102g, which at least in the interior is not electrically conducting so that the electrodes 104a, 104c are not short-circuited. The electrochemical cell 102 can furthermore be delimited to the fop and the bottom by the contacts or contact structures 108a, 108c.

The contacts or the contact structures 108a, 106c of the electrochemical cell 102 can furthermore each comprise a solid electrical conductor, each of which is in contact with the liquid electrode material.

As is shown in FIG. 2, energy can be stored in the energy storage assembly 100 by reducing the metal ions to a liquid metal at the negative pole, and by oxidizing metal atoms to ions at the positive pole. The coil 108 is used to prevent the occurrence of Tayler instability, and thus the mutual inter-mixing of the materials of which the cathode, electrolyte and anode are made. It is sufficient for this purpose, for example, to use one respective winding and to send the charge current or discharge current of the battery, or a portion of the charge current or discharge current, through the same.

Figure 3:
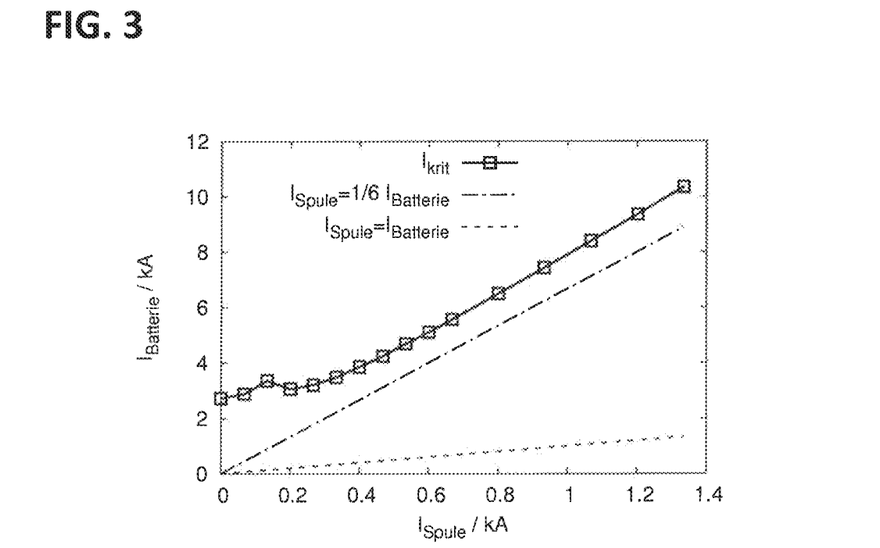
FIG. 3 shows a relationship between the critical current in the electrochemical cell and the current in a coil, wherein the coil stabilizes the electrochemical cell.

FIG. 3 shows the dependence of the current that is critical for the onset of Tayler instability in the fluid on a current, which initially is assumed to be independent and variable, through the coil for the energy storage assembly 100 shown in FIG. 2 and the specifically selected form of a Heimholtz coil 108. Sodium is assumed to be the cathode material which can be a suitable anode material, due to the physicochemical properties thereof (conductivity $\sigma=5.99\times10^6$ S/m, density $\rho=0.878\times10^3$ kg/m$^3$, viscosity $\eta=3.94\times10^{-7}$ m$^2$/s, in each case measured at a temperature of 300° C.) and the low price thereof. For the purpose of illustration, a cube-shaped battery (electrochemical cell 102) having an edge length of 1 m is assumed, wherein the height of the upper liquid sodium layer is assumed to be 50 cm. The Helmholtz coil 108 surrounding this cube 102 has a diameter of 240 cm and a distance between the two sub-coils of 120 cm. When the current in the Heimholtz coil 108 is equalized with that in the battery ($I_{coil}=I_{battery}$), it is apparent that the current flowing in the Helmholtz coil 103 reliably suppresses Tayler instability for ail considered current intensities, if is not necessary to increase the number of windings in the coil, but this is optional or possible with another geometry.

The low number of windings of the coil 108 can result in high sensitivity to the geometric details of the coil feed lines. As is illustrated in FIG. 2, the feed lines to the coil can be configured and/or disposed preferably parallel and very close together, so as to minimize or avoid non-uniformities.

FIG. 3 shows a further curve ($I_{coil}=I_{battery}/6$), wherein the current flowing through the Helmholtz coil is only one sixth of the charge current or discharge current of the battery 102. According to various embodiments, this current may be sufficient to suppress Tayler instability. As a result, the voltage drop at the coil can be reduced, in that only a portion of the charge current or discharge current of the battery 102 flows through the coil assembly 108.

Figure 4:
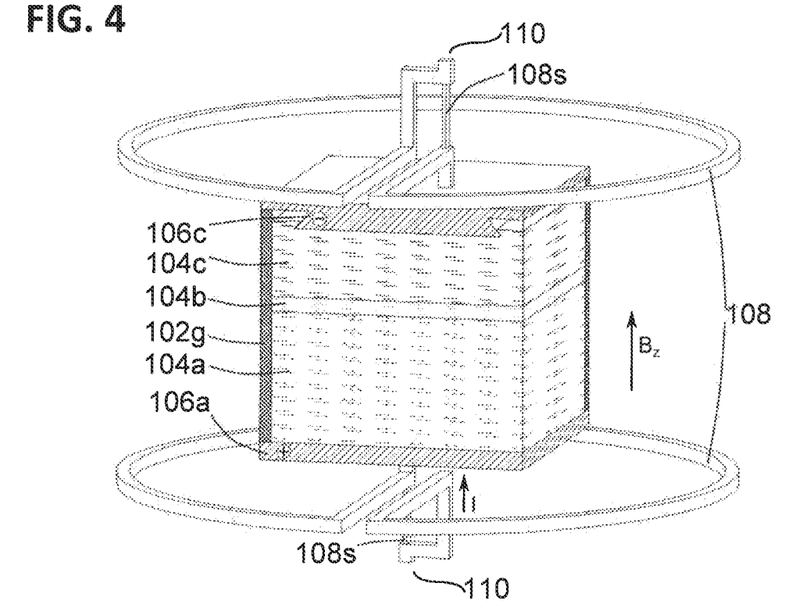
FIGS. 4 to 8 each show a schematic view of an energy storage assembly, according to various embodiments.

FIG. 4 shows an energy storage assembly 100 in a schematic view, wherein the energy storage assembly 100 comprises a current divider 108s or multiple current dividers 108s, so that the coil assembly 108 (such as a Heimholtz coil) can be operated at a lower current than flows through, or in, the electrochemical cell 102 for charging or discharging. A portion of the current is thus conducted through a current branch 108s. In the event that, for example, the current in the Heimholtz; coil 108 is to be only one sixth of the battery current, the ratio of the resistance in the current branch 108s to the resistance in the Heimholtz coil 108 (of the winding) must be one fifth.

According to various embodiments, (the location and position or the like of) the magnetic field-generating structure 108 can be disposed relative to the electrochemical cell 102 and be configured such that a magnetic field is generated within the electrochemical cell 102, which is oriented substantially parallel to the direction of current flow within the electrochemical cell 102.

Figure 5:
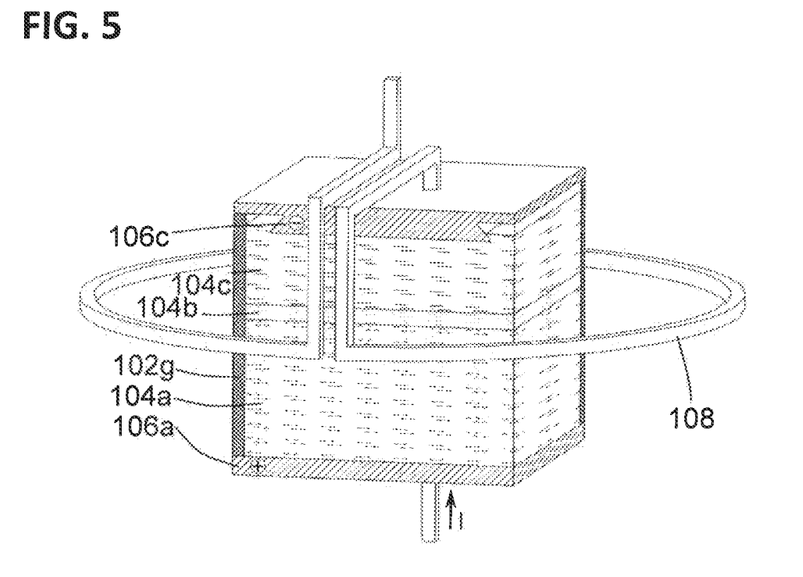

Analogously, as shown in FIG. 5, the magnetic field-generating structure 108 can be provided in the form of a single coil 108, wherein the single coil 108 surrounds the electrochemical cell 102, for example the single coil 108 can be provided at a height that corresponds approximately to half the height of the battery, as illustrated in FIG. 5.

According to various embodiments, the energy storage assembly 100 can be connected to an external electrical circuit 110 for storing electrical energy, wherein the metal ions are reduced to a liquid metal at the cathode and the metal ions are reduced to a liquid metal at the anode.

Figure 6:
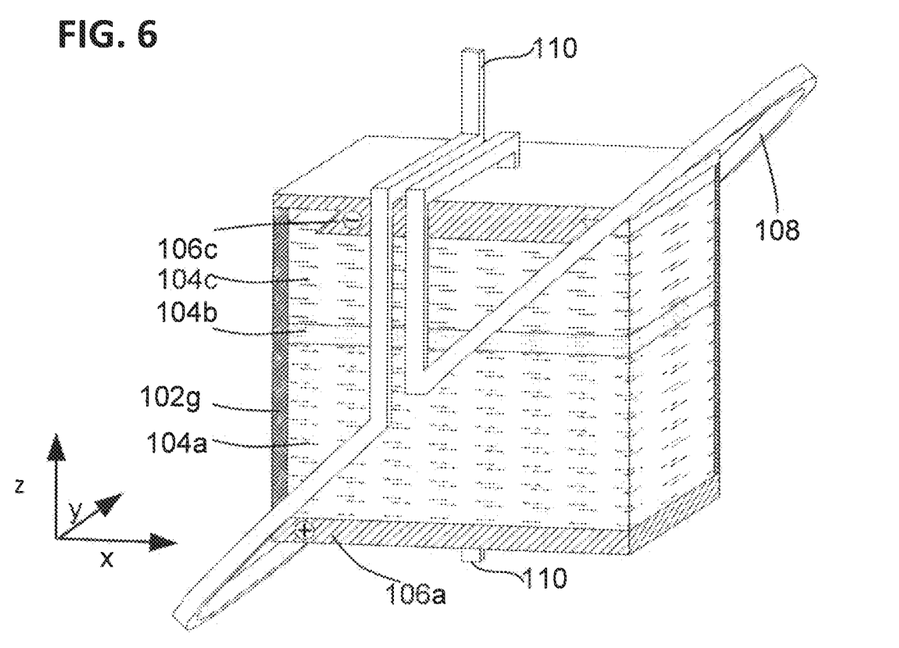
Figure 7:
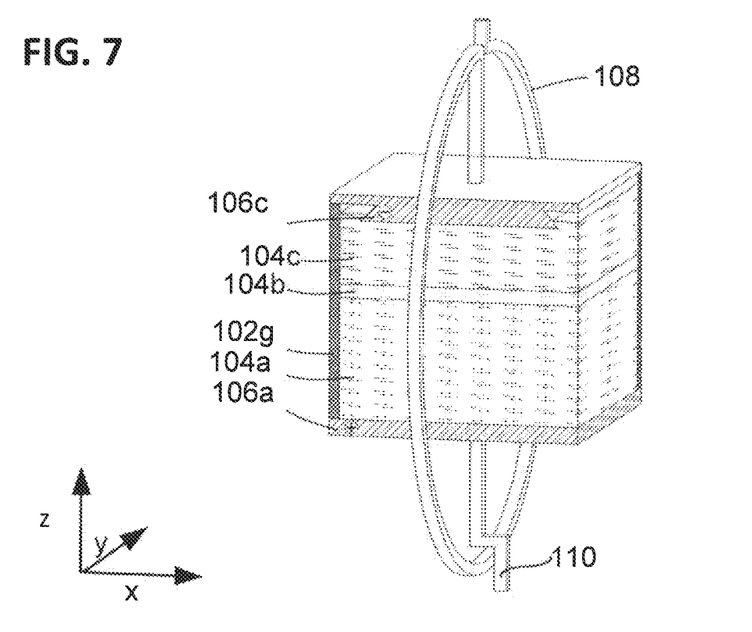

As illustrated in FIG. 6 and FIG. 7, the magnetic field-generating structure 108 can comprise at least one coil, which can be disposed at an angle (or transversely) to the stratification (the interfaces 105a, 105b), such as in an angular range from approximately 0° (as described above) to approximately 45° (as illustrated in FIG. 6) or up to approximately 90° (as illustrated in FIG. 7).

The coil 108, as illustrated in FIG. 6, for example, generates a magnetic field having a z component, as described above, and an x-y component (such as a radial component). The x-y component is located in the same plane as the interfaces 105a, 105b of the stratification of the electrochemical cell 102.

The coil 108, as illustrated in FIG. 7, for example, generates a magnetic field having an x-y component (such as a radial component). The x-y component is located in the same plane as the interfaces 105a, 105b of the stratification of the electrochemical cell 102. According to various embodiments, a radial magnetic field component can be generated from outside the electrochemical cell 102 by way of the magnetic-field generating structure 108.

Figure 8:
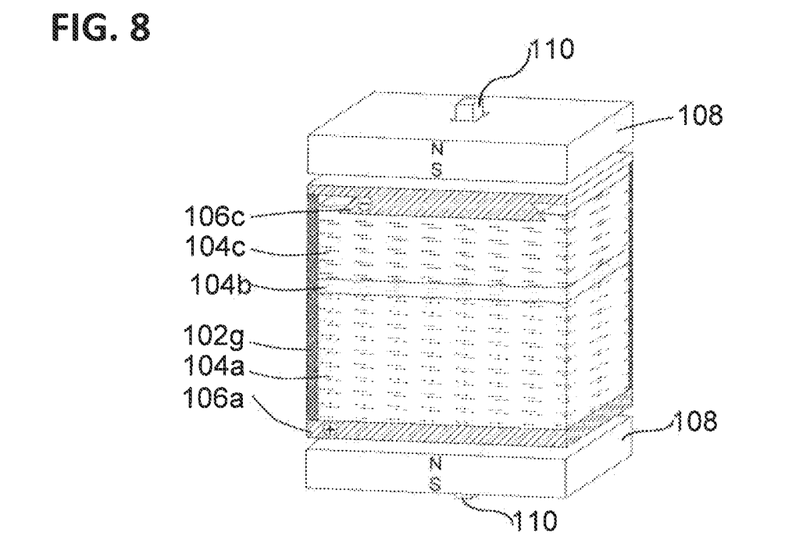

FIG. 8 illustrates an energy storage assembly 100 in a schematic view, wherein the electrochemical cell 102 is stabilized by way of two permanent magnets 108. The electrochemical cell 102 can be disposed between the permanent magnets 108, for example, so that the magnetic field of the permanent magnets 108 penetrates the cell. As described above, the provided magnetic field can have a z component. Alternatively, the permanent magnets (one magnet or multiple magnets) can be disposed relative to the electrochemical cell 102 such that the magnetic field has a radial component.

According to various embodiments, the permanent magnet 108 can be composed of a plurality of smaller permanent magnets or comprise a plurality of smaller permanent magnets. In other words, the magnetic field-generating structure 108 can have an assembly that is composed of a plurality of permanent magnets.

Figure 9:
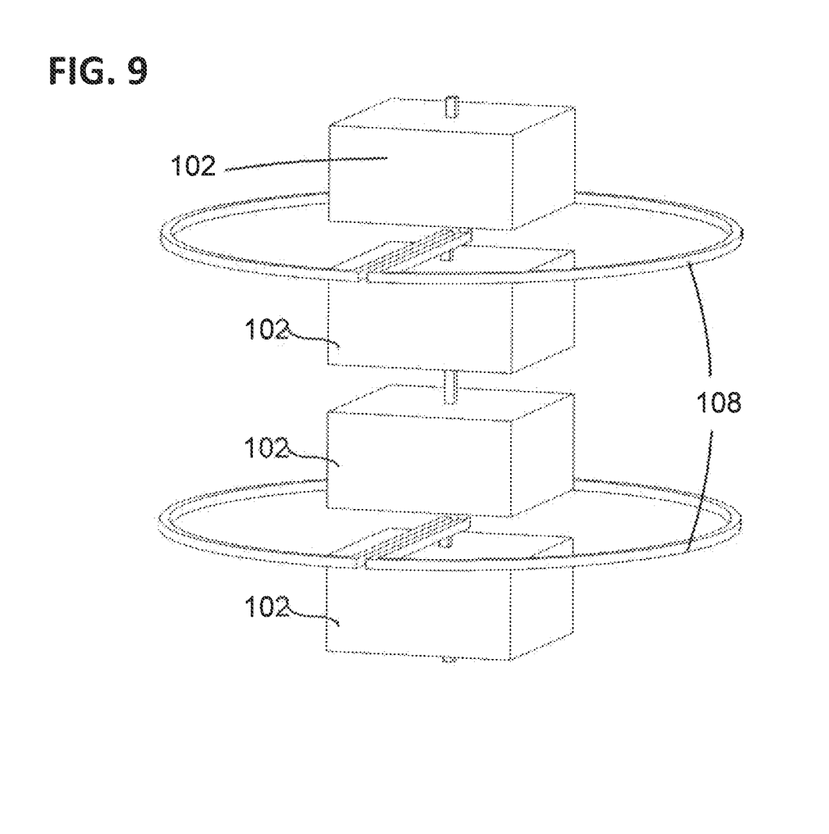
FIG. 9 shows a schematic view of an energy storage cell assembly, according to various embodiments.

As is illustrated in FIG. 9 in a schematic view, an energy storage assembly 100 can comprise multiple electrochemical cells 102 and/or multiple magnetic field-generating structures 108. According to various embodiments, the energy storage assembly 100 comprising multiple electrochemical cells 102 can be referred to as an energy storage cell assembly. It is possible for multiple electrochemical cells 102 to be connected in series and/or in parallel, so that the voltage and the currents of the energy storage cell assembly can be appropriately varied or adapted.

Furthermore, a magnetic field-generating structure 108 can be disposed relative to multiple electrochemical cells 102 such that the multiple electrochemical cells 102 are stabilized, so that the multiple electrochemical cells 102 can be charged or discharged, for example, using very high currents, such as in a range from approximately 1 kA to approximately 1 MA.

Figure 10A:
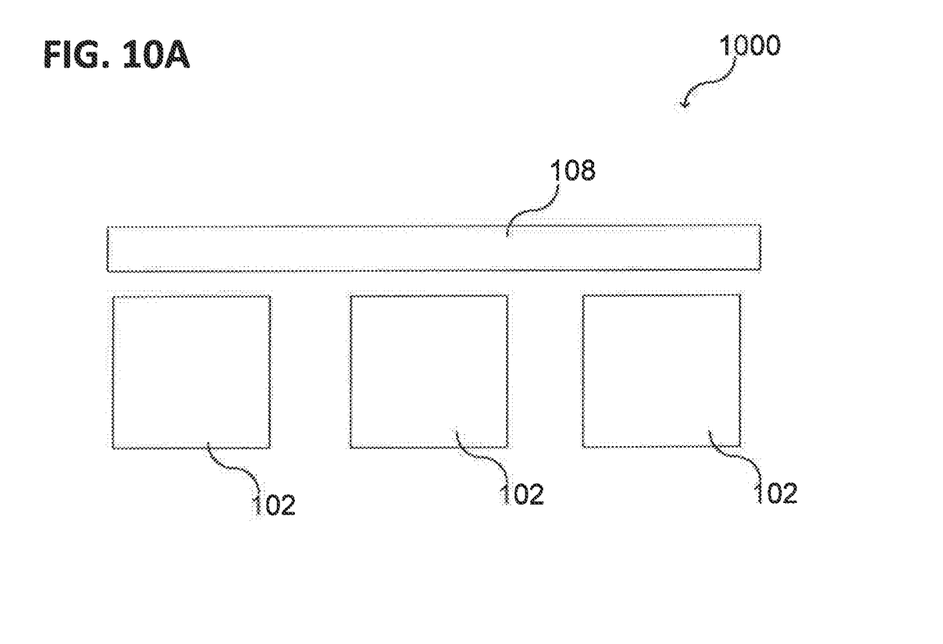
FIGS. 10A to 10C each show a schematic side view or cross-sectional view of an energy storage cell assembly, according to various embodiments.

As illustrated in FIG. 10A, a magnetic field-generating structure 108 can be disposed relative to multiple electrochemical cells 102 and be configured so that the magnetic field-generating structure 108 at the same time stabilizes multiple electrochemical cells 102, which is to say so that the magnetic field generated by way of the magnetic field-generating structure 108 penetrates the multiple electrochemical cells 102 from the outside.

Furthermore, analogously to the manner described above, the magnetic field-generating structure 108 can comprise one or more coils, wherein the one coil or the multiple coils can be disposed above and/or beneath the multiple electrochemical cells 102, for example.

Figure 10B:
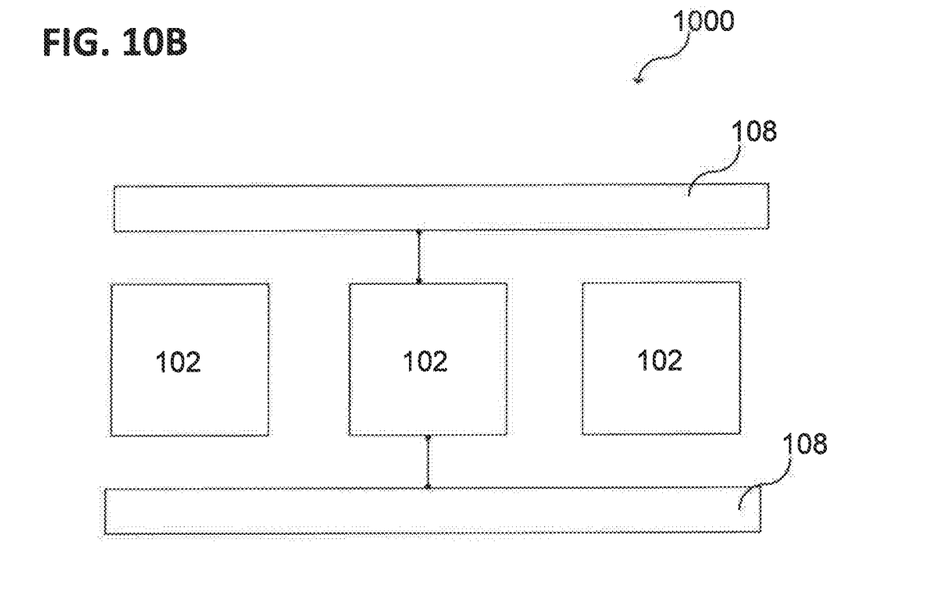

For this purpose, a coil assembly 108, as illustrated in FIG. 18B, for example, (such as a Helmholtz coil assembly or a Helmholtz coil) can be connected to an electrochemical cell 102 in an electrically conducting manner, as described above, wherein the coil assembly 108 is configured such that it provides a magnetic field that stabilizes the multiple electrochemical cells 102. According to various embodiments, an energy storage cell assembly can comprise multiple electrochemical cells 102 and multiple electromagnetic coils, such as in an assembly similar to a Helmholtz coil assembly, as is shown in FIG. 10C, for example.

Figure 10C:
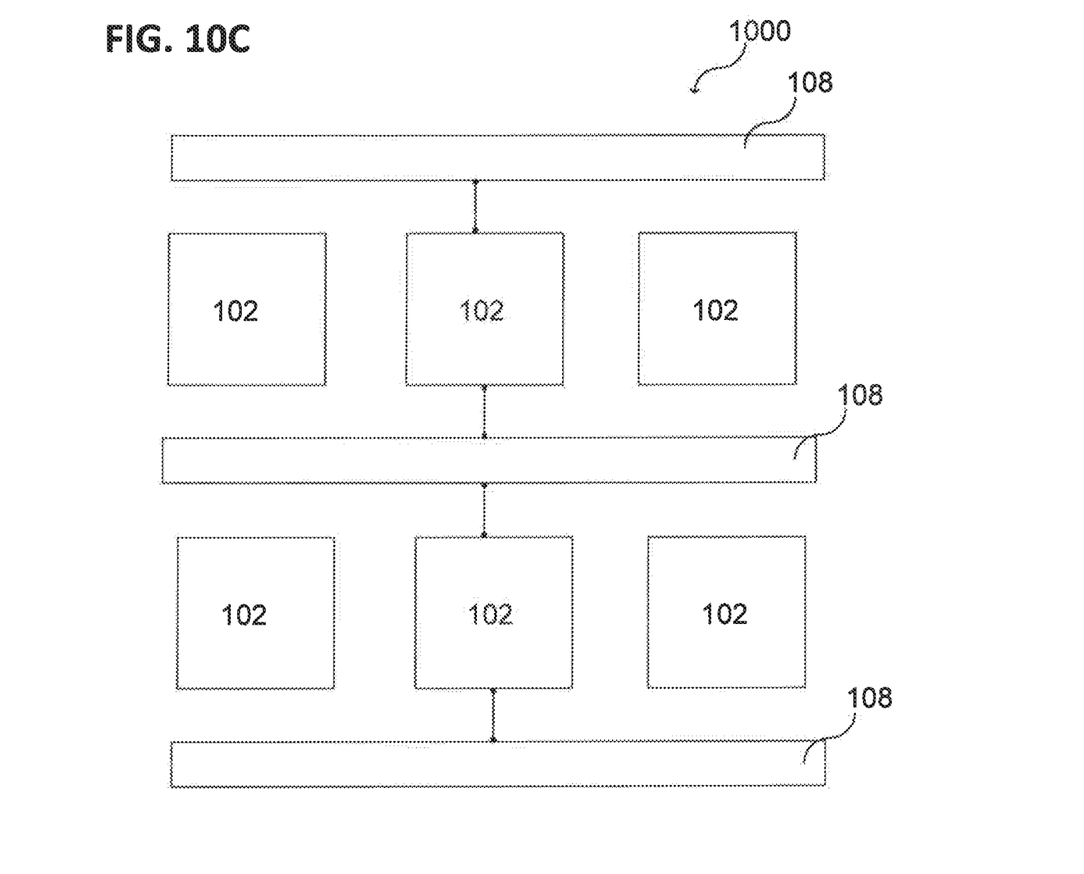

As is illustrated in FIGS. 10A to 10C, an assembly composed of multiple electrochemical cells 102 can comprise, for example: multiple electrochemical cells 102 disposed next to each other, multiple electrochemical cells 102 disposed in one plane, multiple electrochemical cells 102 disposed on fop of each other, multiple electrochemical cells 102 disposed next to and on fop of each other, or any arbitrary arrangement of electrochemical cells 102. A magnetic field-generating structure 108 can be disposed outside the assembly of electrochemical cells 102 (cell assembly) and/or be configured so as to provide a magnetic field that penetrates, or can penetrate, all electrochemical cells 102 of the cell assembly.

Furthermore, the magnetic field-generating structure 108 can also be partially disposed between the multiple electrochemical cells 102 of the cell assembly, such as between two neighboring electrochemical cells 102 of the cell assembly.

The energy storage cell assembly 1000 illustrated in FIGS. 10A to 10C can comprise a cell assembly composed of multiple electrochemical cells 102 and a magnetic field-generating structure 108, wherein the multiple electrochemical cells 102 and the magnetic field-generating structure 108 can be disposed or configured arbitrarily relative to each other corresponding to the functionalities described herein, so that the functionality of the energy storage cell assembly 1000 is not influenced by Tayler instability.

According to various embodiments, an assembly for storing electrical energy (an energy storage assembly 100) is provided, wherein this comprises at least one electrochemical cell 102, and the electrical energy is stored in the at least one electrochemical cell 102. The energy storage assembly 100 can comprise: a stratification of a liquid metal or a liquid metal alloy forming the anode, a liquid electrolyte, and a liquid metal or metalloid or a liquid metal alloy or metalloid alloy forming the cathode, and a system of permanent magnets and/or a coil system comprising at least one single coil, which is able to generate a magnetic field penetrating the electrochemical cell.

The coil system can furthermore be composed of two single coils forming a coil pair that is similar to the configuration of the Heimholtz coil and generates a substantially uniform vertical magnetic field in the electrochemical cell 102.

The coil pair can furthermore be composed of a respective winding through which the charge current or the discharge current of the electrochemical cell 102 (of the battery) can be conducted.

Furthermore, the feed lines for the coils (such as the electrical connection between the electrochemical cell 102 and the coils 108) can be routed very narrowly so as to minimize the resultant non-uniformity of the magnetic field, illustratively, the coils of the magnetic field-generating structure 108 can be electrically interconnected such that a magnetic field that is created by supplying electric current into the coil has only a minor (negligible) impact on the magnetic field configuration, which is to be defined by way of the magnetic field-generating structure 108.

Furthermore, the coil system can be composed of a single coil (for example, having one winding or multiple windings), which is provided at a height that approximately corresponds to half the battery height. Illustratively speaking, the coil system can be composed of a single coil 108, wherein the single coil 108 surrounds the electrochemical cell 102, or wherein the electrochemical cell 102 is disposed within the single coil 108.

According to various embodiments, the energy storage assembly 100 can be used to store electric energy from an external circuit 110, wherein the energy storage assembly 100 can be connected to the external circuit 110 in an electrically conducting manner, and wherein the metal ions are reduced to a liquid metal at the negative pole, and the metal atoms can be oxidized to metal ions at the positive pole.

Furthermore, one coil pair, or multiple coils, can be oriented parallel to each other and connected to each other in an electrically conducting manner such that a substantially uniform and/or rectified magnetic field can be provided between the multiple coils, similarly to a Helmholtz coil or like a Helmholtz coil. Illustratively, it is also possible to provide a substantially rectified and/or uniform magnetic field (having a uniform flux density) between the coils by way of multiple coils, similarly to a Helmholtz coil or like a Helmholtz coll.

According to various embodiments, an energy storage assembly can comprise the following: at least one electrochemical cell, wherein the at least one electrochemical cell comprises a first electrode (for example an anode) that is liquid during operation, an electrolyte that is liquid during operation, and a second electrode (for example a cathode) that is liquid during operation; and a magnetic field-generating structure disposed outside the at least one electrochemical cell for generating a magnetic field, wherein the magnetic field-generating structure is configured such that the magnetic field generated outside the at least one electrochemical cell penetrates the at least one electrochemical cell.

According to various embodiments, the outer circumference can be an area or be understood as an area, for example an outer surface of the electrochemical cell.

The invention claimed is:
1. An energy storage assembly, comprising
at least one electrochemical cell, wherein the at least one electrochemical cell comprises a first electrode that is a liquid during operation, an electrolyte that is a liquid during operation, and a second electrode that is a liquid during operation, wherein the respective first and second liquid electrodes and the liquid electrolyte extend, as respective layers, in x-y planes orthogonal to a z-axis and the liquid electrolyte layer forms respective interfaces with the liquid first electrode layer and the liquid second electrode layer, each of the interfaces being in a respective x-y plane orthogonal to the z-axis; and
a magnetic field-generating structure disposed only outside the outer circumference of the at least one electrochemical cell at a distance from the at least one electrochemical cell for generating a magnetic field, wherein the magnetic field-generating structure is so configured that the generated magnetic field penetrates the at least one electrochemical cell and has at least one magnetic field component parallel to the z-axis which component is of sufficient strength to suppress Tayler instability.

2. The energy storage assembly according to claim 1, wherein the first electrode that is a liquid during operation comprises at least one member selected from the group consisting of:

metals,
metal alloys,
metalloids, and
metalloid alloys.

3. The energy storage assembly according to claim 2, wherein the second electrode that is a liquid during operation comprises at least one member selected from the group consisting of:

metals,
metal alloys,
metalloids, and
metalloid alloys.

4. The energy storage assembly according claim 1, wherein the magnetic field-generating structure comprises at least one permanent magnet.

5. The energy storage assembly according to claim 1, wherein the magnetic field-generating structure comprises an electrically conductive coil assembly.

6. The energy storage assembly according to claim 1, wherein the magnetic field-generating structure comprises a coil assembly that is so configured that the at least one electrochemical cell is positioned between a first coil of the coil assembly and a second coil of the coil assembly.

7. The energy storage assembly according to claim 6, wherein the coil assembly is a Helmholtz coil assembly.

8. The energy storage assembly according to claim 1, wherein the magnetic field-generating structure is connected to the at least one electrochemical cell in an electrically conducting manner, so that current flows through the magnetic field-generating structure during charging or discharging of the at least one electrochemical cell.

9. The energy storage assembly according to claim 1, further comprising:

at least one heat source for heating the at least one electrochemical cell.

10. A method for storing electrical energy, comprising providing at least one energy storage assembly according to claim 1, and connecting said at least one electrical cell into an electric circuit, whereby electrical energy is stored by way of a chemical reaction in the at least one electrochemical cell of the energy storage assembly.

11. The energy storage cell assembly according to claim 1, wherein the at least on electrochemical cell is a plurality of electrochemical cells.

* * * * *